(12) United States Patent
Ohkawa

(10) Patent No.: US 6,616,290 B2
(45) Date of Patent: Sep. 9, 2003

(54) LIGHT GUIDE PLATE, SURFACE LIGHT SOURCE DEVICE AND LIQUID CRYSTAL DISPLAY

(75) Inventor: Shingo Ohkawa, Yoshikawa (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 10/145,028

(22) Filed: May 15, 2002

(65) Prior Publication Data

US 2002/0196388 A1 Dec. 26, 2002

(30) Foreign Application Priority Data

May 30, 2001 (JP) ........................................ 2001/163234

(51) Int. Cl.⁷ .............................................. F21V 8/00
(52) U.S. Cl. ........................................................ 362/31
(58) Field of Search ................................. 362/31, 561

(56) References Cited

U.S. PATENT DOCUMENTS

| | | | | |
|---|---|---|---|---|
| 6,036,327 A | * | 3/2000 | Blonder et al. | 362/31 |
| 6,123,431 A | * | 9/2000 | Teragaki et al. | 362/31 |
| 6,139,163 A | * | 10/2000 | Satoh et al. | 362/31 |
| 6,454,452 B1 | * | 9/2002 | Sasagawa et al. | 362/561 |
| 6,485,157 B2 | * | 11/2002 | Ohkawa | 362/31 |
| 6,522,373 B1 | * | 2/2003 | Hira et al. | 349/65 |
| 6,530,677 B1 | * | 3/2003 | Mori et al. | 362/31 |

* cited by examiner

Primary Examiner—Laura K. Tso
(74) Attorney, Agent, or Firm—Staas & Halsey LLP

(57) ABSTRACT

A surface light source device and LCD provide a visual angle highly uniform two-dimensionally and reduced fine brightness unevenness, utilizing a light guide plate. The surface light source device illuminating an LCD panel employs a light guide plate having a back face 34 provided with many micro-reflectors 20. Beams P1, P2 representing an inner input light is inner-reflected by a slope 21 and then by another slope 22 or 22 and then 21, becoming an inner out light Q1, Q2 proceeding toward an emission face 33. Postures of micro-reflectors 20 are deviated from a standard posture on x-axis, y-axis and z-axis, respectively, thereby causing beams Q1, Q2 to inner-impinge to the emission face 33 at proceeding directions which are different three-dimensionally from each other. This difference is amplified through refraction at emission from the emission face 33. Fine brightness unevenness appearing depending on formed-position/no-formed-position of micro-reflectors is suppressed because the inner output light has a flux already expanded when reaching the emission face 33.

3 Claims, 18 Drawing Sheets

(STANDARD POSTURE: r=s=t=0°)

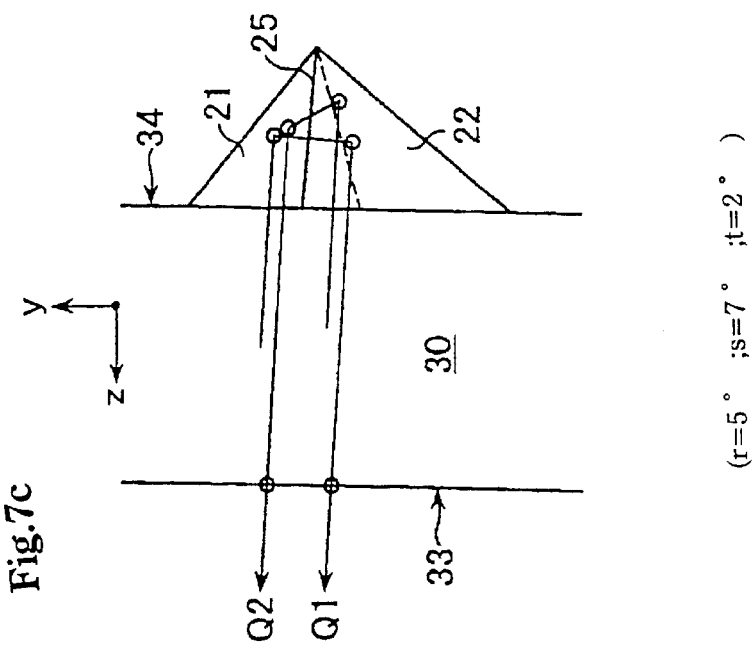
Fig.7c
$(r=5°\ ;s=7°\ ;t=2°\ )$
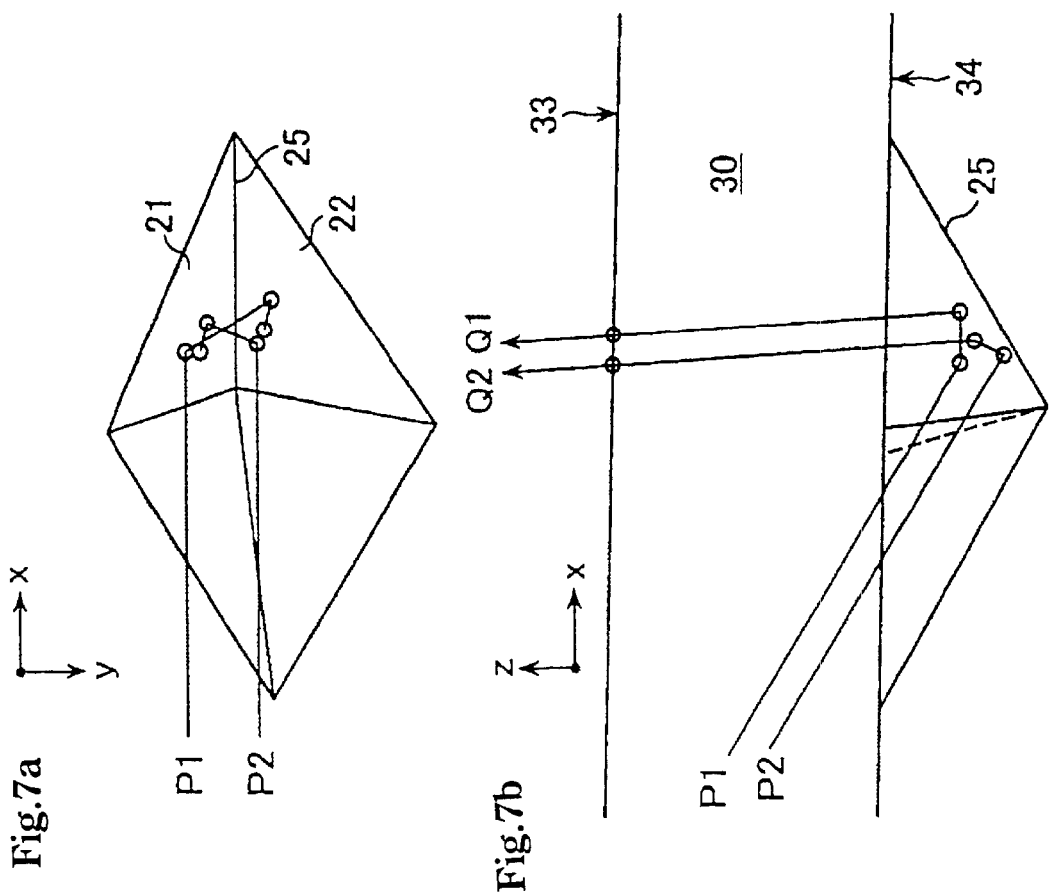
Fig.7a
Fig.7b $(r = 5°\ ; s = t = 0°\ )$

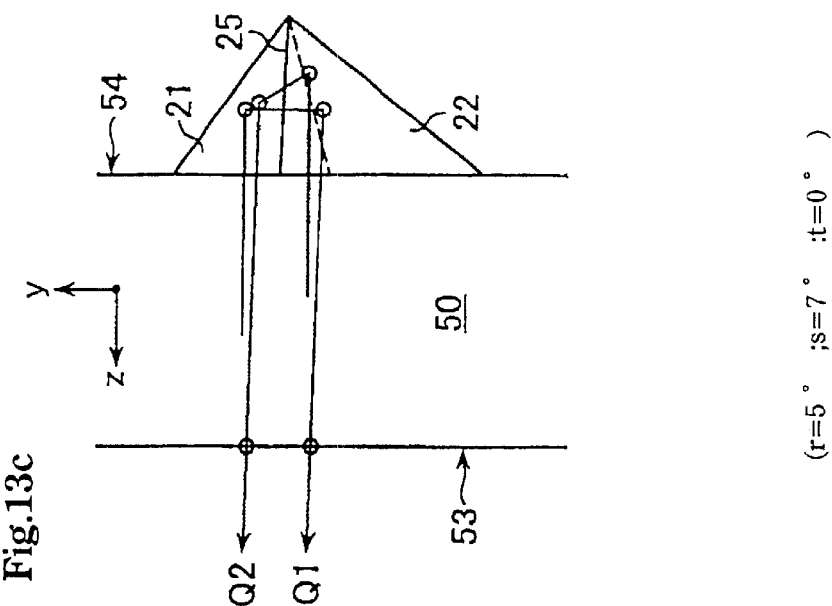
Fig.13c
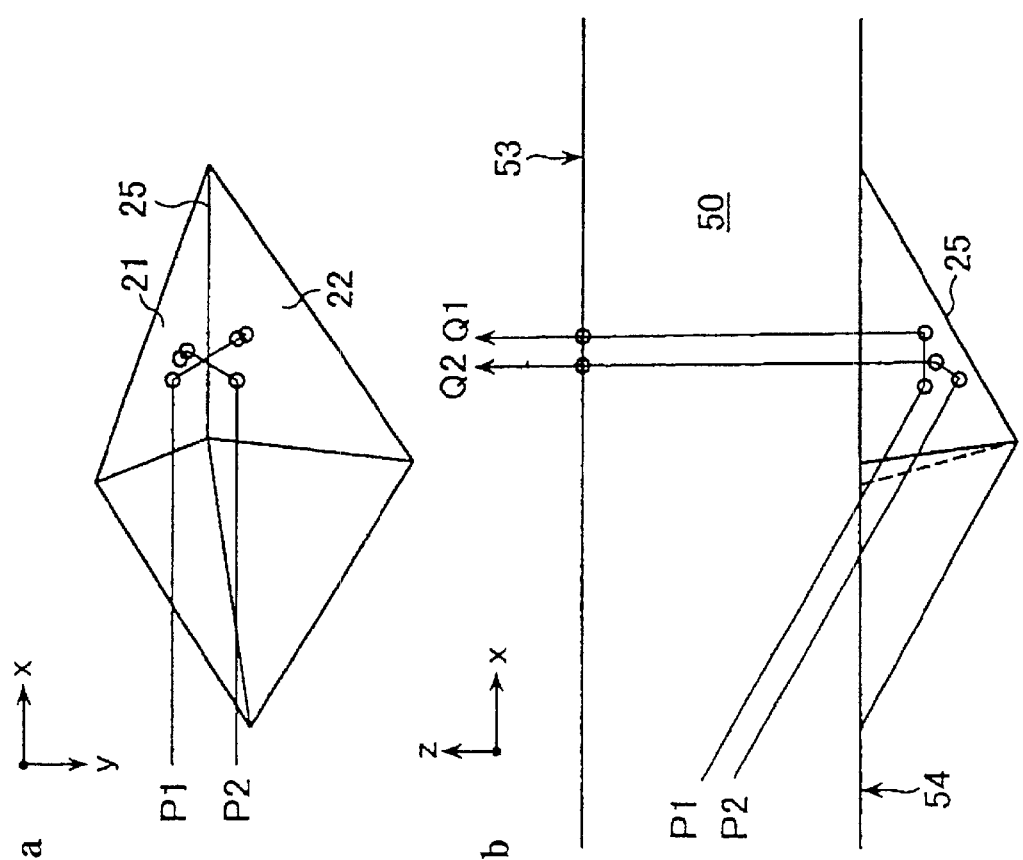
Fig.13a
Fig.13b
(r=5° ;s=7° ;t=0°)

LIGHT GUIDE PLATE, SURFACE LIGHT SOURCE DEVICE AND LIQUID CRYSTAL DISPLAY

BACKGROUND

1. Field of Invention

The present invention relates to a light guide plate, surface light source device and liquid crystal display, in particular, to improvements of a light guide plate having a back face provided with a great number of micro-reflectors, a surface light source device employing the foresaid improved light guide plate and a liquid crystal display employing the surface light source device for illumination a liquid crystal display panel. The present invention is applied to liquid crystal displays for personal computers, car-navigation systems or portable telephones, being applied further to surface light source devices and light guide plates used therein.

2. Related Art

According to a well-known prior art, a surface light source device has a light guide plate which is supplied with light sideways and outputs the light through an emission face after introducing the light into the light guide plate and applying direction-conversion, being broadly employed for illuminating an LCD panel or other uses. Although rod-like fluorescent lamps (cold cathode tubes) have been used broadly as primary light sources, those using point-like light sources such as LEDs (Light Emitting Diodes) tend to be employed recently.

In such surface light source devices, the light introduced into a light guide plate is outputted from an emission face after being light-direction-converted. As known well, light-direction-conversion within a light guide plate and emission from an emission face are promoted by employing a light guide plate made of light scattering-guiding material, or by applying emission promoting processing such as making a back face or emission face light-diffusible.

However, as known well, such means causes the emitted light to be preferentially directed to much forward inclined directions (for example, about 60 degrees with respect to a frontal direction). Such greatly inclined output directions are much quite different from usually desired output directions, which are usually generally frontal directions or around them. According to a prior proposition to realize a direction-conversion capable of providing a preferential output direction which is desired, a great number of micro-reflectors are formed on a back face of a light guide plate.

The micro-reflectors on the back face of the light guide plate in accordance with the proposed art are shaped like a great number of micro-projections, which generate an inner propagation light proceeding toward an emission face by means of an innerface reflection of the projections. This inner propagation light is emitted from the emission face, becoming an output light. Here described is an example of arrangement comprising a light source device, which employs a light guide plate provided with micro-reflectors, for backlighting a liquid crystal display panel by referring to FIG. 1 to FIG. 4.

In the first place, FIG. 1a is a back side plan view of an outlined arrangement of a surface light source device employing a light guide plate provided with micro-reflectors for backlighting of a liquid crystal display panel, and FIG. 1b is a side view from the left side in FIG. 1a. FIGS. 2a and 2b illustrate an array example of micro-reflector 20 in the arrangement. In these illustrations, a light guide plate denoted by reference numeral 10 is made of a transparent material such as acrylic resin, polycarbonate (PC) or cycloolefin-type resin, a side end face of which provides an incidence face 12.

A rod-like primary light source (cold cathode tube) L1 is disposed along the incidence face 12 which is supplied with light from the primary light source. The light guide plate 10 has major faces 13 and 14 one of which provides an emission face 13. The other face (back face) 14 is provided with a great number of micro-reflectors 20 shaped like micro-projections.

A well-known liquid crystal display panel PL is disposed on the outside of the emission face 13 to provide a liquid crystal display of backlighting type. It is noted that the micro-reflectors 20 are not shown in FIG. 1a. Size values are merely examples, being indicated in mm.

The primary light source L1 emits light, which is introduced into the light guide plate 10 through the incidence face 12. An inner propagation light travels within the light guide plate 10 and undergoes direction-conversion on entering into micro-reflectors 20 through inner-reflections by inner faces of projections, with the result that light proceeding toward the emission face 13 is produced. Such inner reflection occurs twice generally as described later.

An example of arrangement of micro-reflectors 20 on the back face 14 of the light guide plate 10 is shown in FIGS. 2a and 2b. It is noted that the primary light L1 disposed along the incidence face 12 is a rod-like cold cathode tube having an emitting portion length of which is somewhat smaller than that of the incidence face 12. Both ends of electrode portions EL1 and EL2 which are incapable of emitting light. Such a design is adopted often in order to avoid the electrode portions EL1 and EL2 of both ends from protruding.

Micro-reflectors 20 are distributed on the back face 14 so that covering rate tends to increase according to an increasing distance from the incidence face 12.

Micro-reflectors 20 are arranged in corner area C and D located close to the electrode portions EL1 and EL2, respectively, at a specifically large covering rate. Such a covering rate distribution prevents brightness from varying depending on distance from the incidence face 12 and from being short in the corner areas. It is noted that "covering rate" of micro-reflectors is defined as area occupied by micro-reflectors per unit area of a back face of a light guide plate.

Each micro-reflector 20 is shaped like a quadrangle-pyramid, projecting from a general plane representing the back face 14 (i.e. a plane formed by provisionally removing the micro-reflectors 20). Each micro-reflector 20 has a posture determined as to cause light approaching there to be inner-inputted efficiently and to be converted into an inner output light proceeding generally at right angles with respect to the emission face 13. Such processes are described with referring to FIGS. 3, 4a, 4b and 4c.

FIG. 3 shows one of the micro-reflectors 20 with an illustration of direction conversion of an inner propagation light effected by the micro-reflector. In the illustration, the inner propagation light is represented by representative light beams P1 and P2. Beam P1 represents an inner propagation light which is reflected by the slope 21 and then by the slope 22 in order while beam P2 represents an inner propagation light which is reflected by the slope 22 and then by the slope 21 in order. Beams QI and Q2 represent inner output light beams produced from beams P1 and P2, respectively.

It is noted that a pair of beams P1 and P2 run in parallel with a main approaching direction of light which is inner-inputted in a corresponding micro-reflector 20. In FIG. 3, coordinate O-XYZ is a right-hand coordinate used to denote directions, Z-axis of which extends vertically to the emission face 13 (more precisely, a second general plane representing the emission face; in the same way, hereafter) and has a +Z-direction that corresponds to a "frontal direction".

X-axis is perpendicular to both Z-axis and the incidence face 12, having an orientation (plus-minus sign) such that +X-direction extends as to get farther from the incidence face 12. Y-axis runs at right angles with respect to both Z-axis and X-axis as to provide a right-hand rectangular Cartesian coordinate O-XYZ (having original O optionally positioned), extending in parallel with the incidence face 12.

For the sake of description in the instant specification, a rectangular Cartesian coordinate O-xyz, which is independent of coordinate O-XYZ, is defined for each micro-reflector. Defined are x-axis, y-axis and z-axis as follows.

In the first place, z-axis extends in the same direction (including orientation) as that of Z-axis, having +z-direction which corresponds to the "frontal direction". A projection of a main approaching direction (including orientation) of light to be inner-inputted into a corresponding micro-reflector onto the emission face gives a direction of x-axis which extends perpendicularly to z-axis. And y-axis runs at right angles with respect to both z-axis and x-axis as to provide a right-hand rectangular Cartesian coordinate O-xyz (having original O optionally positioned).

It should be noted that x-axis may extend in a different direction as compared with X-axis and y-axis may extend in a different direction as compared with Y-axis in general, although O-xyz accords with O-XYZ in the case of the micro-reflector illustrated in FIG. 3. For example, micro-reflectors arranged in the corner portions C and D shown in FIG. 2 give y-axes non-parallel with Y-axis and x-axes non-parallel with X-axis because projections of main approaching directions of inner input light to the micro-reflectors onto XY-plane are inclined with respect to X-axis.

As illustrated in FIG. 3, each micro-reflector 20 has a pair of slopes 21 and 22 located on a side farther from the incidence face 12, the slopes providing a first and second inner-reflection faces. Both slopes (inner-reflection faces; in the same way, hereafter) 21 and 22 meet each other to form a ridge 25. There are another pair of slopes 23 and 24 located on a side nearer to the incidence face 12, the slopes meeting each other to form a ridge 26.

After all, in this embodiment, each micro-reflector 20 like a quadrangle-pyramid is provided by four slopes. It is noted that foot lines (inter sections with a general plane representing the back face 14) of the micro-reflectors are shown by dotted lines.

Viewing from the standpoint of light propagating within the light guide plate 10, the micro-reflectors 20 provide dents inside. The dents include valleys formed by the slopes 21, 22 and valleys formed by the slopes 23, 24.

Representative light beams P1 and P2 approach the micro-reflector 20 from the incidence face 12 directly or after being reflected by the emission face 13 and/or back face 14. Beams P1 and P2 reach one of the slopes 21 and 22. Some light may be directed to the slope 21 or 22 after being inner-reflected by the slope 23 or 24.

Much of light reaching the slope 21 or 22 is inner-reflected by the slope 21 and then by the slope 22, or by the slope 22 and then by the slope 21, with the result that an inner propagation light proceeding toward the emission face 13 is produced. This light is emitted from the emission face 13 to provide output light Q1, Q2 of the light guide plate 10.

Thus a pair of 21 and 22 of each micro-reflector 20 function as a conversion output portion which makes an inner-output light from an inner-inputted light by converting a proceeding direction of the inner-inputted light. It is noted that references Q1 and Q2 are used to denote emitted beams.

Some consideration is given to postures of micro-reflectors 20 as follows. FIGS. 4a, 4b and 4c illustrate from three directions how light representing beams P1 and P2 inner-inputted to a micro-reflector formed in a standard posture are converted into inner output light Q1 and Q2 proceeding toward a frontal direction. FIG. 4a gives an illustration viewed from +z-axis direction (the same as +Z-direction due to definition), FIG. 4b gives an illustration viewed from +y-axis direction (the same as +Y-direction in this case), and FIG. 4c gives an illustration viewed from +x-axis direction (the same as +X-direction in this case).

Referring to these illustrations, behaviour of the above-mentioned representing beams P1 and P2 is described again with the use of the coordinate o-xyz.

As shown in FIG. 4a, representing beams P1 and P2 have an approaching direction to a micro-reflector 20 and the approaching direction provides a projection onto xy-plane in a direction consistent with +x-direction. Representing beams P1 and P2 inputted to the micro-reflector 20 are, as easily understood specifically from FIGS. 4b and 4c, inner-reflected by the slopes 21 and 22 inclined with respect to every one of xy-plane, yz-plane and zx-plane, being converted into beams Q1 and Q2 directed toward +z-direction.

These beams Q1 and Q2 represent inner output light, being parallel to each other. Beams Q1 and Q2 are emitted from emission face 13 toward +z-direction.

In the instant specification, if such direction conversion is effected by each micro-reflector having a posture (as shown in FIGS. 4a, 4b and 4c), the posture is called "standard posture". Standard posture requires the following conditions (1), (2) and (3) to be satisfied at the same time.

Condition 1; A projection of an extending direction of a ridge 25 of a conversion output portion onto xy-plane accords with x-axis direction (See FIG. 4a specifically).

Condition 2; A bisectional plane, which bisects an angle made by a first and second inner-reflection faces 21 and 22 so that the ridge 25 extends on the bisectional plane, is perpendicular to xy-plane (See FIG. 4a specifically).

Condition 3; An inner input light inner-inputted to the micro-reflector from a main approaching direction (+x-direction) is converted into an inner output light proceeding toward +z-axis direction.

If a light guide plate has a back face provided with a great number of micro-reflectors 20 arranged in such standard posture and the light guide plate is used in a surface light source device, primary light supplied sideways is converted directly into inner output light directed to a generally frontal direction which is outputted at a high efficiency, bringing a merit with a simple structure.

OBJECT AND SUMMARY OF INVENTION

However, in prior arts employing micro-reflectors in standard posture tends to cause the output light to have an excessive directivity, being suffered from a problem that a small deviation of viewing direction from a main emission direction (i.e. direction of Q1 and Q2) brings a sharp reduction in brightness (Narrow viewing angle).

In particular, a posture on z-axis is made fitting in with the above-mentioned Condition 1, there rises a drawback that viewing angle in zx-pane differs much from that in yz-pane and the latter (viewing angle in yz-pane) is very small.

FIGS. 5 and 6 are graphs to illustrate results of simulation calculation of angular characteristics of emission intensity in a case where a micro-reflector is used in standard posture. In both graphs, abscissa indicates angles (inclination angles) in zx-plane wherein plotting s with sign−correspond to a nearer side to the incidence face and plotting with sign+ corresponds to a farther side from the incidence face. Ordinate indicates angles (inclination angles) in yz-plane, wherein plotting with sign+corresponds to right-handed inclinations as viewed from the incidence face and plotting with sign−corresponds to left-handed inclinations as viewed from the incidence face.

In FIGS. 5 and 6, light intensity after a well-known Cosine correction (correction of values in accordance with cosine of inclinations of a light measuring direction) is illustrated in five discrete-intensity-levels. FIG. 6 is a graph for three-dimensional indication prepared based on the graph of FIG. 5, wherein light intensity is indicated in discrete-density shades and three-dimensional iso-brightness curves, and height from abscissa-ordinate plane expresses brightness (light intensity) after Cosine correction.

A set of parameters r, s, t are used as required for indicating a posture of a micro-reflector with respect to standard posture. It is noted that direction-angles (degrees) around z-axis, x-axis and y-axis are expressed by r, s and t with respect to those of standard posture, respectively. Of course, standard posture corresponds to r=s=t=0.

It is understood from the graphs that a main output direction (corresponding to Q1, Q2) has an angle on abscissa (angle in zx-plane) about 0 degree and an angle on ordinate (angle in yz-plane) about 0 degree, namely, being directed to a generally frontal direction, and that viewing angle in yz-plane is much smaller than that in zx-plane.

In addition to such a problem of small viewing angle, fine unevenness in brightness rises. That is, since inner output light has a very strong directivity, although a very high brightness is obtained just above a micro-reflector, only a small quantity of inner-inputted light reaches parts deviated from positions just above any micro-reflector (correspond between micro-reflectors), leading to darkness. As a result, fine unevenness in brightness arises, leading to feeling of glaring.

As described later about an example for comparison, although it has been tried relaxing the problem by loosing the above condition 1 or other means, satisfactory results have not been obtained.

An object of the present invention is to overcome the above-described drawbacks of prior arts and to provide a light guide plate, surface light source device and liquid crystal display employing the device which have an expanded viewing angle in a right-and-left-width direction as viewed from an incidence face side and a reduced fine unevenness in brightness that corresponds to micro-reflector-formed-position/micro-reflector-not-formed-position.

The present invention solves the above problem by means of giving three-dimensional bias with respect to standard posture (i.e. rotation around z-axis, pitching around x-axis and rolling around y-axis) to a great number of micro-reflectors formed on a back face of a light guide plate.

In the first place, the present invention is applied to a light guide plate that is supplied with light from a primary light source and has an emission face provided by a major face, a back face provided by another major face opposite with the emission face and an incidence face for light input.

The back face is provided with a great number of protrusion-shaped micro-reflectors for light-proceeding-direction conversion. Each of the micro-reflectors includes a conversion output portion that includes a ridge portion, a first inner-reflection face and a second inner-reflection face, the first and second inner-reflection faces extending on both sides of the ridge portion and being inclined with respect to a first representative plane representing the back face, respectively.

The ridge, the first inner-reflection face and the second inner-reflection face provide a valley inside the micro-reflector.

The valleys are configured as to get narrower and shallower according to an increasing distance from the incidence face. This causes an inner input light reaching the valleys to be reflected one of the first and second inner reflection faces and then the other of the first and second inner reflection faces and producing an inner output light proceeding toward the emission face.

And each micro-reflector is required to have a posture that satisfy conditions according to features of the present invention. To describe the conditions, "x-axis, y-axis and z-axis" are defined according to the following (1) to (3) and "standard posture" is defined according to the following (41):

(1) x-axis is a projection of a main approaching direction of the inner input light onto a second representative plane representing the emission face;

(2); z-axis is an axis extending from the back face to the emission face as to be perpendicular to the emission face;

(3) y-axis is an axis extending perpendicularly to both x-axis and z-axis as to form a right-hand coordinate system in combination with x-axis and z-axis;

(4) "standard posture" of a micro-reflector is defined as a posture such that satisfies the following Condition 1 to Condition 3 (the same as those forementioned) at the same time.

Condition 1; a projection of an extending direction of the ridge of the conversion output portion onto xy-plane accords with x-axis direction.

Conditions 2; a bisectional plane, which bisects an angle made by the first and second inner-reflection faces so that the ridge extends on the bisectional plane, is perpendicular to xy-plane.

Condition 3; an inner input light inner-inputted to the micro-reflector from a main approaching direction is converted into an inner output light proceeding in z-axis direction.

A posture of micro-reflector in accordance of a feature of the present invention is expressed as follows by using these definitions.

Each of the micro-reflectors has a posture which is substantially deviated from standard posture around x-axis, y-axis and z-axis. "Deviations" of posture are preferably small angles.

Practical deviations of posture are, for instance, about 3 degrees to about 10 degrees around z-axis, 5 degrees to 15 degrees around x-axis and 1 degrees to 5 degrees around y-axis. Concrete examples are described later in Embodiments.

Such three-dimensional posture inclination causes an inner output light produced by each micro-reflector to have an angular expansion, in particular, in yz-plane. Accordingly, a natural viewing angle having a reduced directional bias is obtained. Further saying, angularly expanded proceeding directions are given to an inner output light produced by each micro-reflector, leading to an increased inner-incidence range (area) to an emission face.

As a result, a reduced fine unevenness in brightness that corresponds to micro-reflector-formed-position/micro-reflector-not-formed-position is provided.

In the next place, the present invention is applied to a surface light source device having a primary light source and a light guide plate supplied with light from the primary light source. The light guide plate is one improved as above. A liquid crystal display in accordance with the present invention is provided by arranging the surface light source device for illuminating a liquid crystal display panel. The features of the light guide plate improved according to the present invention are inherited to the surface light source device and liquid crystal display.

That is, obtained are surface light source devices and liquid crystal displays which show viewing angles free from directional biasing to a specific direction. And the surface light source devices have a relaxed fine unevenness in brightness that corresponds to micro-reflector-formed-position/micro-reflector-not-formed-position, causing the result liquid crystal displays employing the surface light source devices to show an improved displaying quality.

BRIEF DESCRIPTION OF DRAWINGS

FIG. 7 illustrates light paths of representing beams P1 and P2 inner-inputted to a micro-reflector in the embodiment (inclined around z-axis, y-axis and x-axis) as viewing from +z-axis direction (FIG. 7a), from −y-axis direction (FIG. 7b) and from +x-axis and y-axis direction, respectively;

FIG. 13 illustrates, for comparison, light paths of representing beams P1 and P2 inner-inputted to a micro-reflector inclined around z-axis and x-axis, as viewing from +z-axis direction (FIG. 13a), from −y-axis direction (FIG. 13b) and from +x-axis direction, respectively;

EMBODIMENT

Figure 1A:
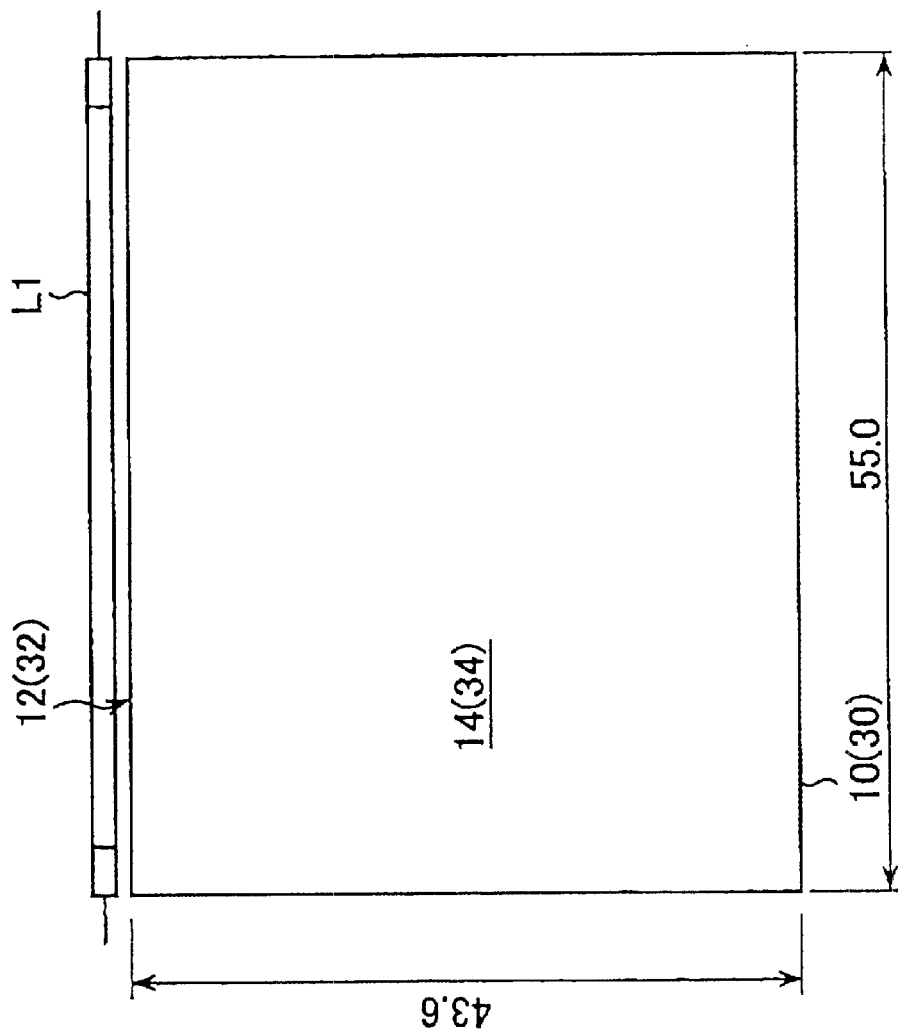
FIGS. 1a and 1b illustrate an outlined arrangement of a liquid crystal display including a surface light source device employing a light guide plate provided with micro-reflectors for backlighting, FIG. 1a being a plan view from the back side of the light guide plate, FIG. 1b being a side view from the left side in FIG. 1a, and both FIGS. 1a and 1b being referred for describing not only prior arts but also an outlined arrangement of a liquid crystal display in accordance with an embodiment.

A liquid crystal display of an embodiment in accordance with the present invention is described below. In the first place, basic arrangement relation among a primary light source, light guide plate and liquid crystal display panel may be the same as that shown in FIGS. 1a and 1b. However, that a light guide plate 30 provided with a feature of the present invention is employed instead of the light guide plate 10 shown in FIGS. 4a, 4b and 4c.

It should be reminded that a great number of micro-reflectors 20 in standard posture are formed on the back face 14 of the light guide plate 10. And further note that reference numerals for the light guide plate 30 and its incidence face 32, emission face 33 and back face 34 are bracketed in FIGS. 1a and 1b.

The light guide plate 30 is made of a transparent material such as acrylic resin, polycarbonate (PC) or cycloolefin-type resin, like the light guide plate 10, a side end face of which provides an incidence face 32.

A rod-like primary light source (cold cathode tube) L1 is disposed along the incidence face 32 which is supplied with light from the primary light source. The light guide plate 30 has major faces 33 and 34 one of which provides an emission face 33, the other major face 34 providing a back face. The back face 34 is provided with a great number of micro-reflectors 20 shaped like micro-projections. A well-known liquid crystal display panel PL is disposed on the outside of the emission face 33 to provide a liquid crystal display of backlighting type.

Figure 1B:
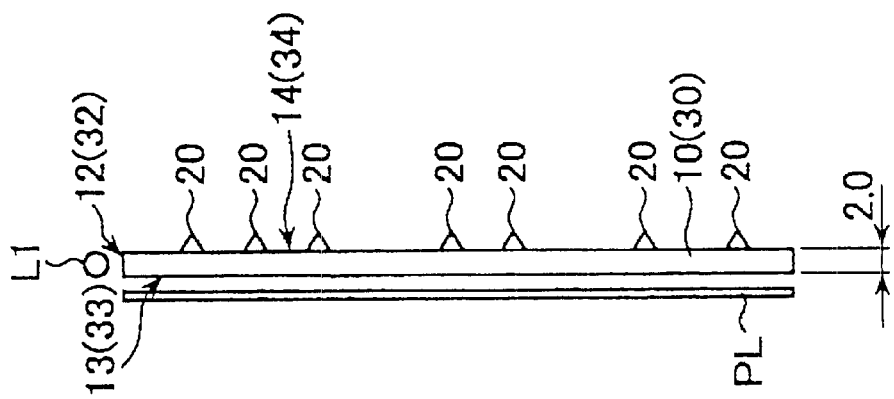

It is noted again that the micro-reflectors 20 are not shown in FIG. 1a and size values are merely examples.

The primary light source L1 emits light, which is introduced into the light guide plate 30 through the incidence face 32. An inner propagation light travels within the light guide plate 30 and undergoes direction-conversion on entering into micro-reflectors 20 through inner-reflections, with the result that light proceeding toward the emission face 33 is produced. Such inner-reflections occur twice generally in the same way as the prior-art employing the light guide plate 10.

Figure 2:
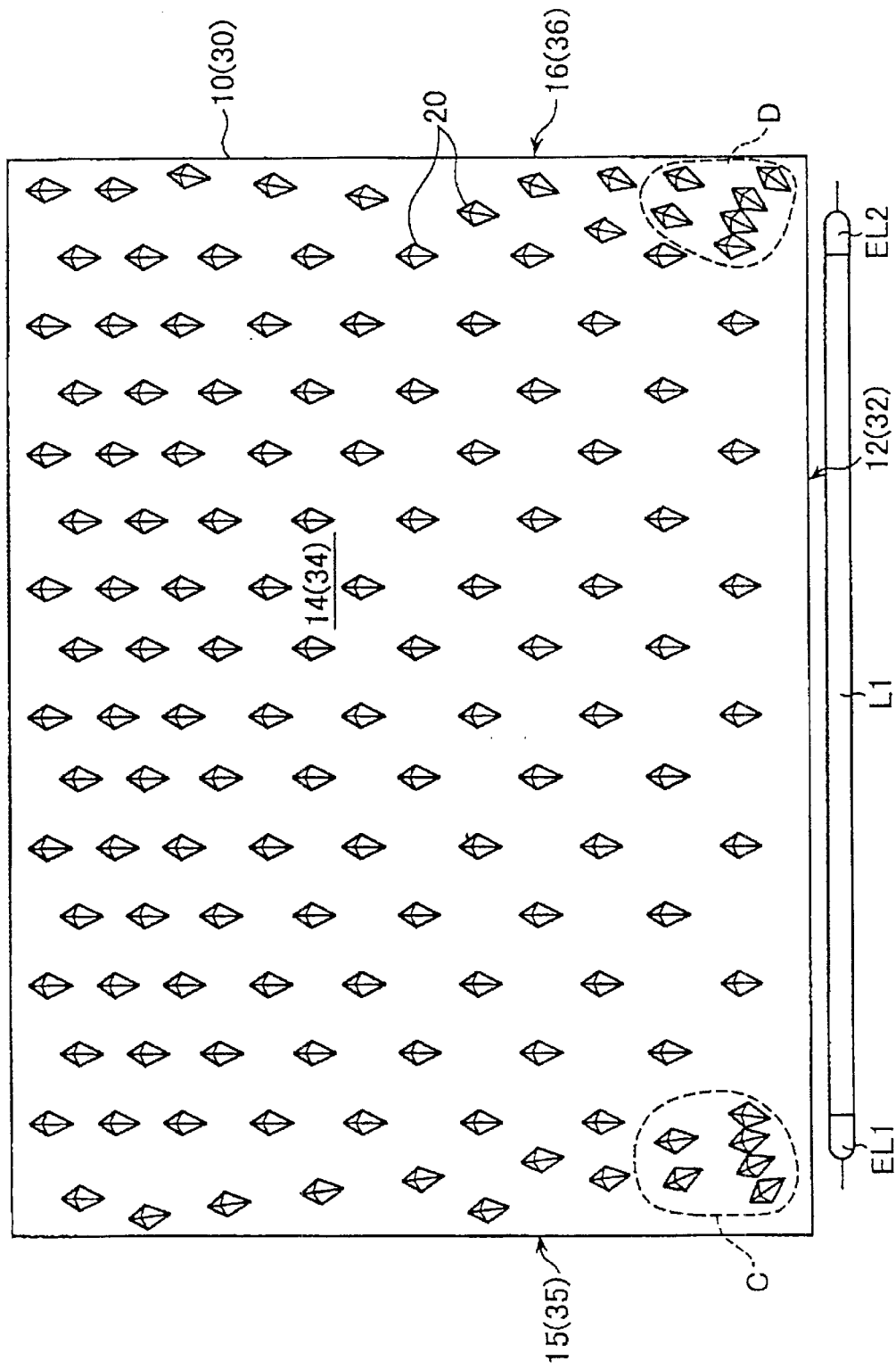
FIG. 2 shows an arrangement example of micro-reflectors on the light guide plate shown n FIGS. 1a and 1b, being referred for describing not only prior arts but also a micro-reflector arrangement in the embodiment.

In the next place, the arrangement of the micro-reflectors 20 on the back face 34 of the light guide plate 30 is the same as that shown in FIG. 2.

Corresponding to this, the bracketed reference numerals in FIG. 2 are used. The micro-reflectors 20 are distributed on the back face 34 of the light guide plate 30 so that covering rate tends to increase according to an increasing distance from the incidence face 32.

Micro-reflectors 20 are arranged at a specifically large covering rate in corner area C and D located close to the electrode portions EL1 and EL2, respectively. Such a covering rate distribution prevents brightness from varying depending on distance from the incidence face 32 and from being short in the corner areas.

Each micro-reflector 20 is shaped like a quadrangle-pyramid, projecting from a general plane representing the back face 34 (i.e. a plane formed by provisionally removing the micro-reflectors 20).

It is important that each micro-reflector 20 has a posture different from one in the prior arts. That is, while the fore-mentioned prior art example shows micro-reflectors in standard posture (See FIGS. 4a to 4c; s=t=0), this embodiment applies rotational shifts of 5 degrees around z-axis, 7 degrees around x-axis and 2 degrees around y-axis with respect to standard posture. Using r, s and t, r=5 degrees, s=7 degrees and t=2 degrees.

Figure 4A:
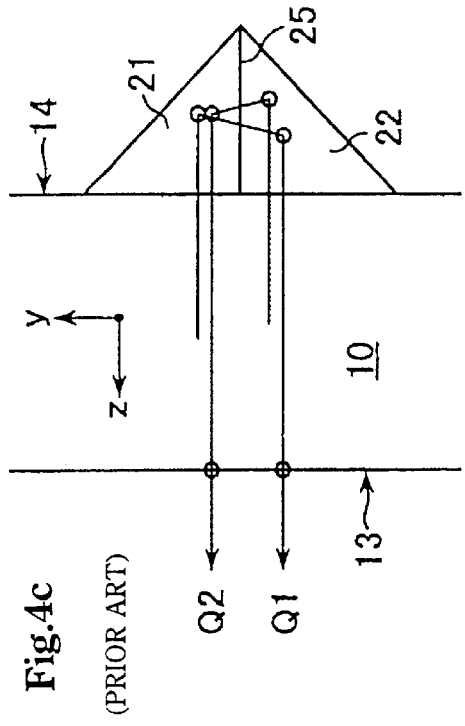
FIG. 4 illustrates light paths of representing beams P1 and P2 inner-inputted to a micro-reflector formed in a standard posture from +z-axis direction (FIG. 4a), as viewing from −y-axis direction (FIG. 4b) and from +x-axis and +y-axis direction, respectively.
Figure 4B:
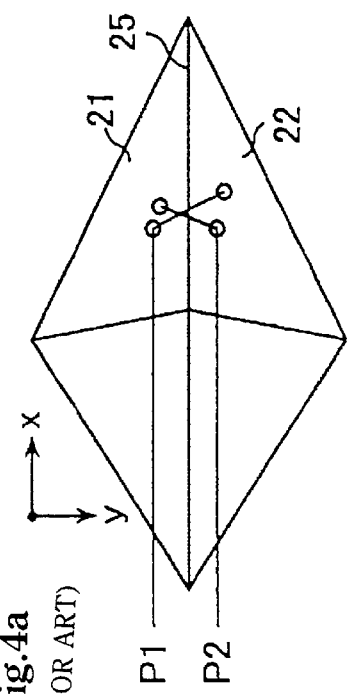
Figure 4C:
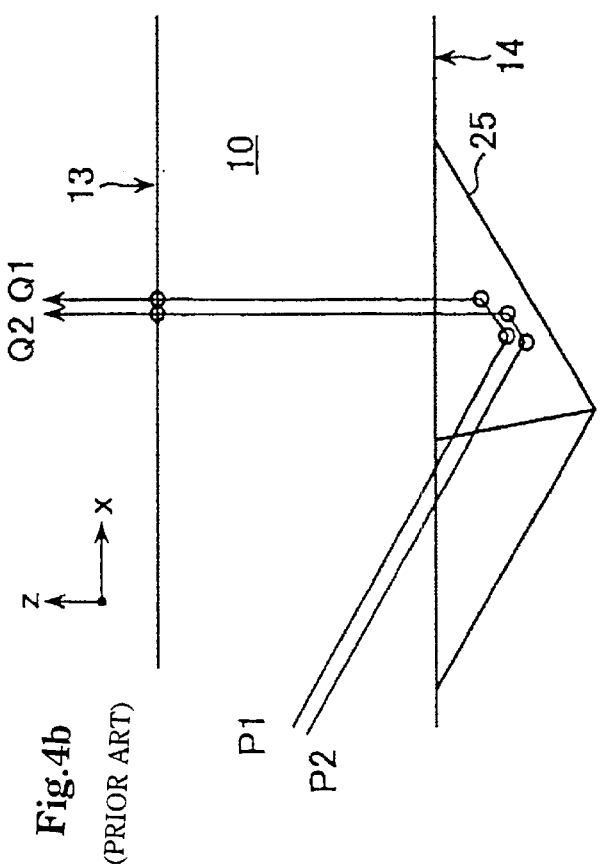

For such a case where the micro-reflectors are postured as to inclined three-dimensionally, FIGS. 7a, 7b and 7c illustrate outlined light paths in a way of illustration like FIGS. 4a, 4b and 4c.

As previously mentioned, beam P1 represents an inner propagation light which is reflected by the slope 21 and then by the slope 22 in order while beam P2 represents an inner propagation light which is reflected by the slope 22 and then by the slope 21 in order. Beams P1 and P2 proceed in parallel with a main approaching direction to the micro-reflector concerned.

As shown in FIGS. 7a, 7b and 7c, an inner input light represented by beam P1 is inner-reflected by the slopes 21 and 22 of the micro-reflector 20 in order, with the result that an inner output light QI is produced.

In a similar way, an inner input light represented by beam P2 is inner-reflected by the slopes 22 and 21 of the micro-reflector 20 in order, with the result that an inner output light Q2 is produced. Inner output light is emitted from the emission face 33 to become an output light of the light guide plate 10.

Thus the slopes 21 and 22 of the micro-reflector 20 function as a conversion output portion that applies direction conversion to an inner-inputted light to provide an inner output.

The micro-reflector 20 has a posture deviated from standard posture around x-axis, y-axis and z-axis, respectively.

This causes the slopes 21 and 22 (first and second inner-reflection faces) to have directions which are changed three-dimensionally from those in standard posture. Therefore beams Q1 and Q2 are inner-incident to the emission face 33 in proceeding directions which are different three-dimensionally from each other. This difference is amplified by refraction on emitting from the emission face 33.

Actually emitted light from the emission face 33 distributes around such representative beam Q1 and around such representative beam Q2. Thus, after all, each micro-reflector causes proceeding directions to have a two-dimensionally expanded distribution, as compared with the case of standard posture (See FIG. 4).

It should be also noted inner output light Q1 and Q2 have already expanded fluxes when they reach the emission face 33. This reduces fine unevenness in brightness which would appear depending on formed-position/not-formed-position of micro-reflectors 20.

Figure 5:
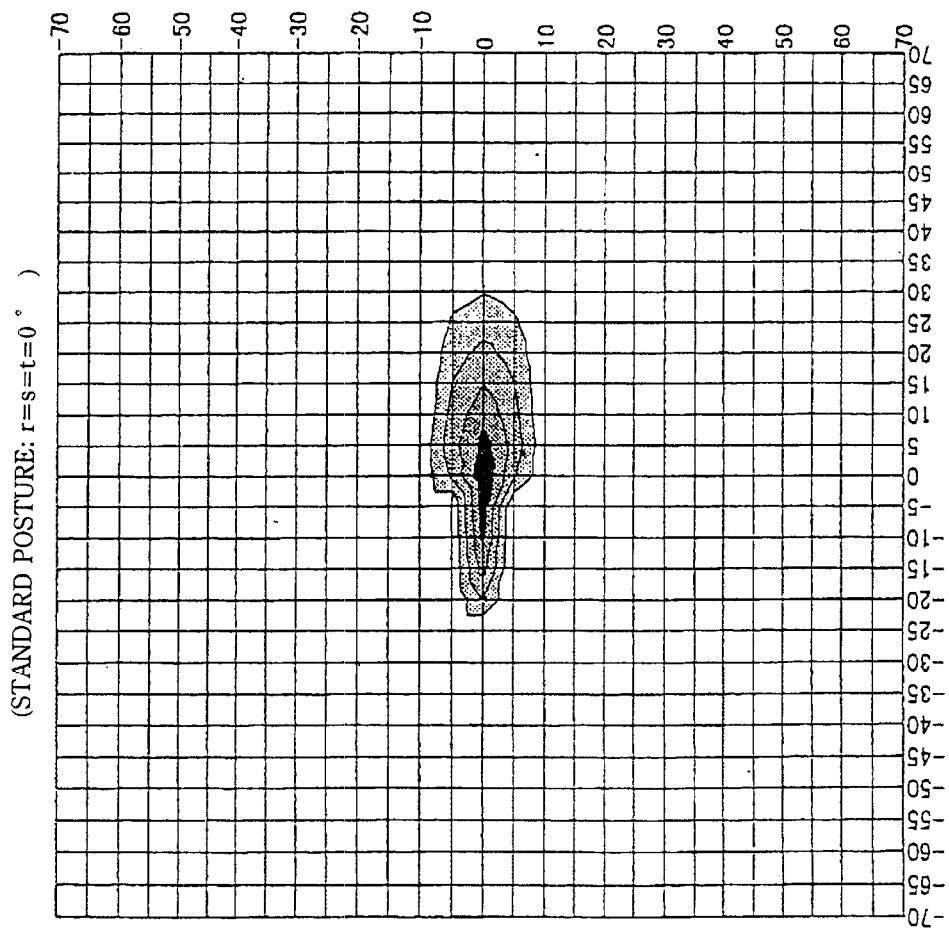
FIG. 5 is a graph to illustrate results of simulation calculation of angular characteristics of emission intensity in a case where a micro-reflector is used in standard posture, the intensity (after COS correction) being indicated in discrete-density shades.
Figure 6:
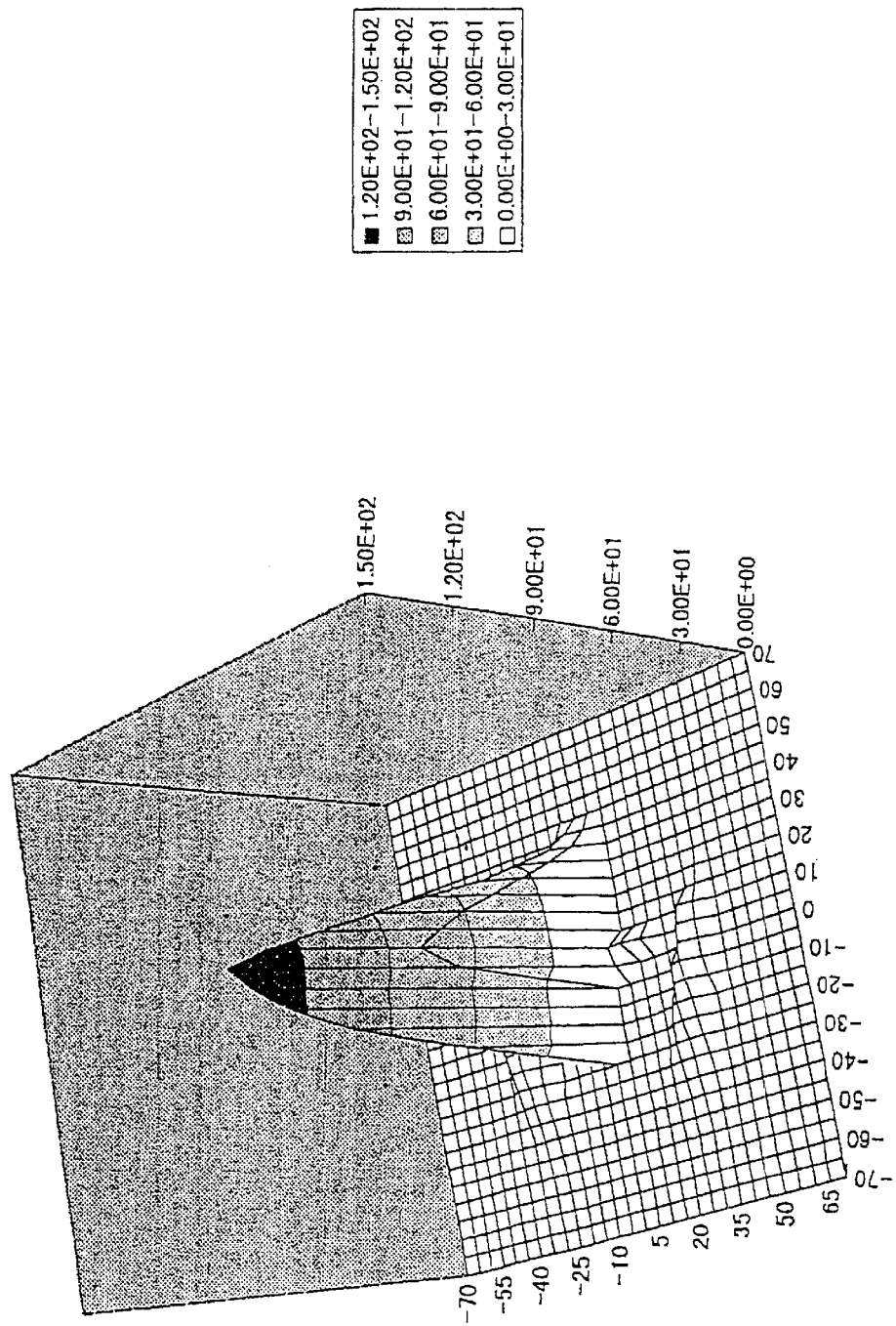
FIG. 6 is a graph prepared based on the same simulation calculation as that of FIG. 5, the intensity (after COS correction) being indicated in discrete-density shades and three-dimensional iso-brightness curves.
Figure 8:
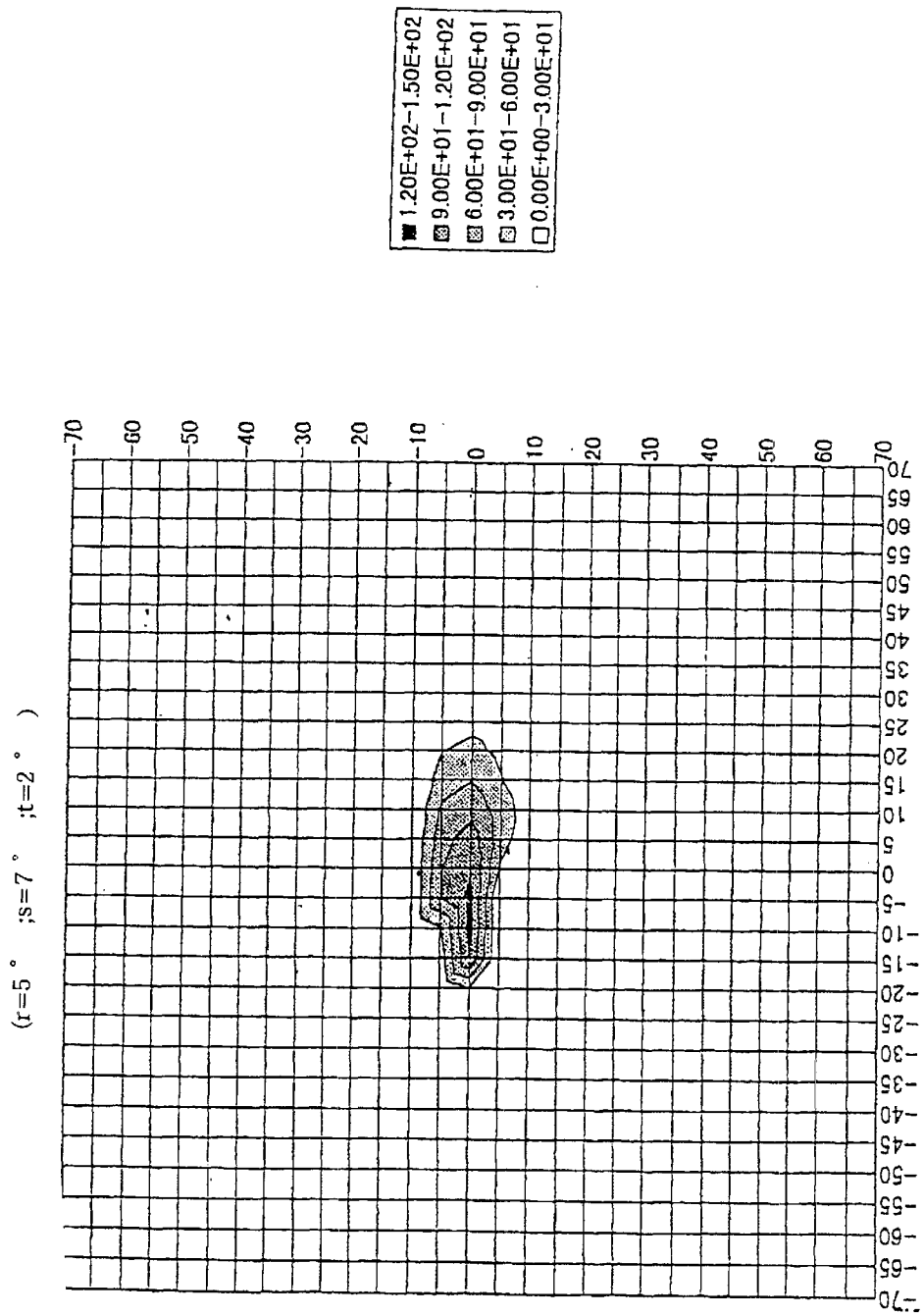
FIG. 8 is a graph to illustrate results of simulation calculation of angular characteristics of emission intensity in a case where a micro-reflector is used in the embodiment (inclined around z-axis, y-axis and x-axis), the intensity (after COS correction) being indicated in discrete-density shades.
Figure 9:
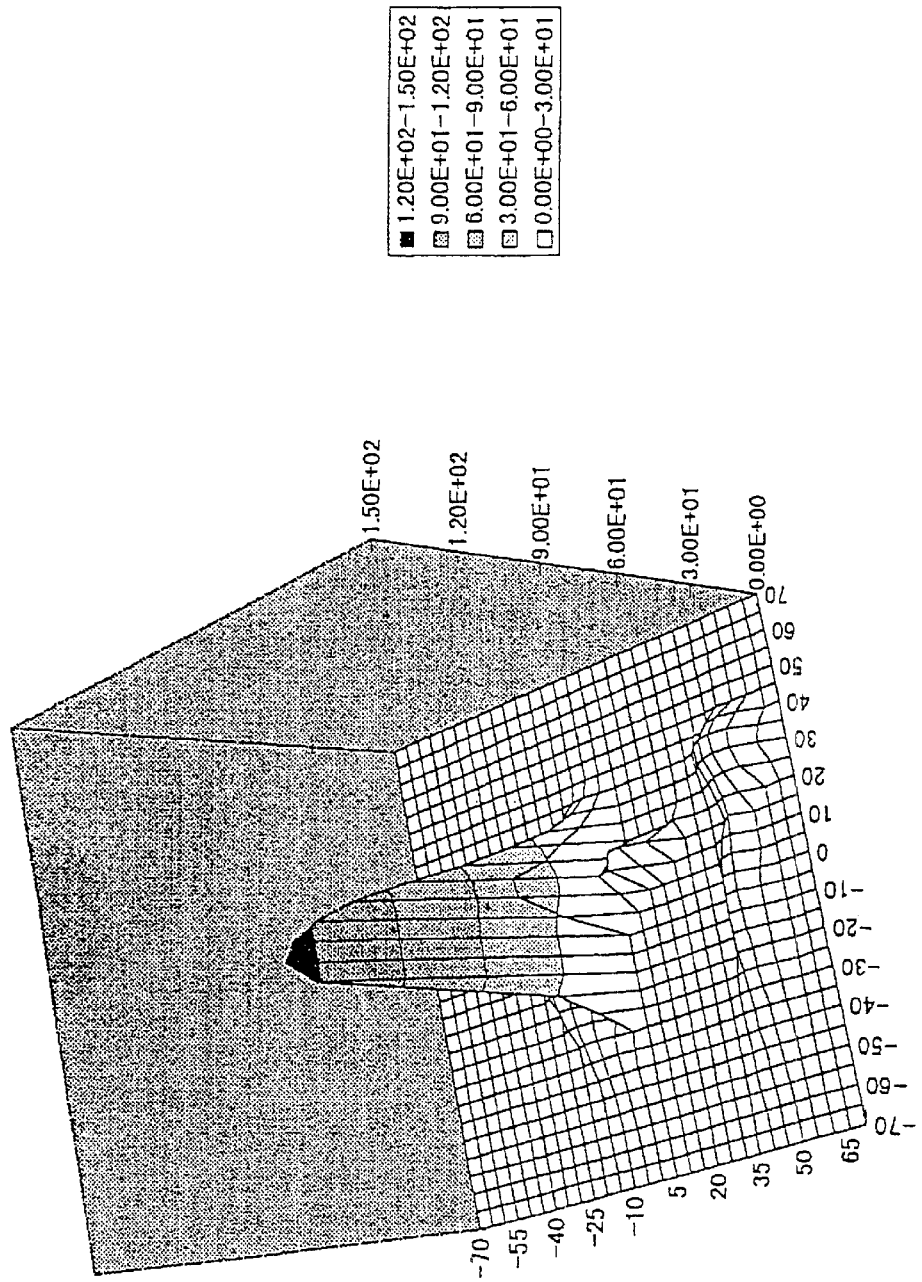
FIG. 9 is a graph prepared based on the same simulation calculation as that of FIG. 8, the intensity (after COS correction) being indicated in discrete-density shades and three-dimensional iso-brightness curves.

FIGS. 8 and 9 are graphs to illustrate results of simulation calculation of angular characteristics of emission intensity of one micro-reflector employed in this embodiment. Manners of illustration (definitions of abscissa and ordinate, depiction of light intensity and so forth) are the same as those of FIGS. 5 and 6, repeated explanation of which are omitted.

It is understood from FIGS. 8 and 9 that a main output direction (corresponding to Q1 Q2) is deviated from a frontal direction about 10 degrees on abscissa (angle in zx-plane) but both viewing angle in yz-plane and viewing angle in zx-plane are remarkably wide. In particular, as compared with the case of FIGS. 4 to 6 where the former is much narrower than the latter, a striking improvement is achieved.

FIGS. 10a to 10c and FIGS. 13a to 13c illustrate, for comparison, light paths of representing beams P1 and P2 involving direction conversion in a case where r=5 degrees, s=t=0 degree (5 degree inclination only around z-axis) and another case where r=5 degrees, s=7 degrees, t=0 degree (inclinations around z-axis and x-axis).

Figure 10C:
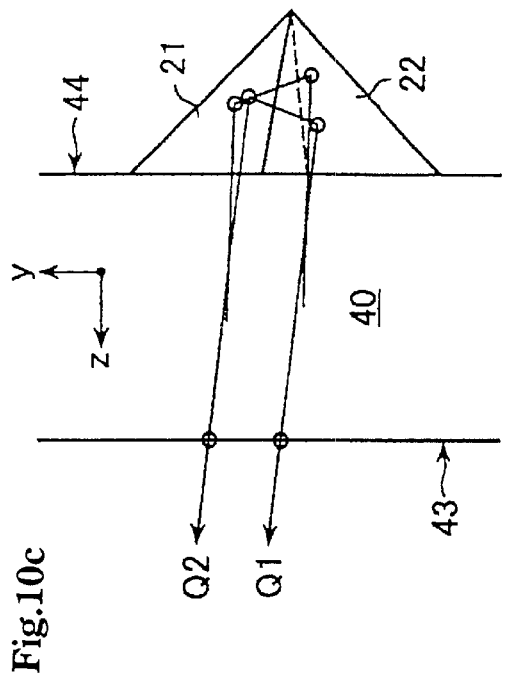
FIG. 10 illustrates, for comparison, light paths of representing beams P1 and P2 inner-inputted to a micro-reflector inclined around z-axis, as viewing from +z-axis direction (FIG. 10a), from −y-axis direction (FIG. 10b) and from +x-axis and y-axis direction, respectively.
Figure 10A:
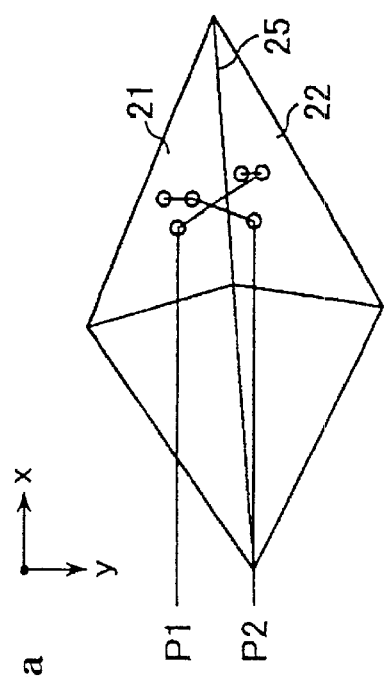
Figure 10B:
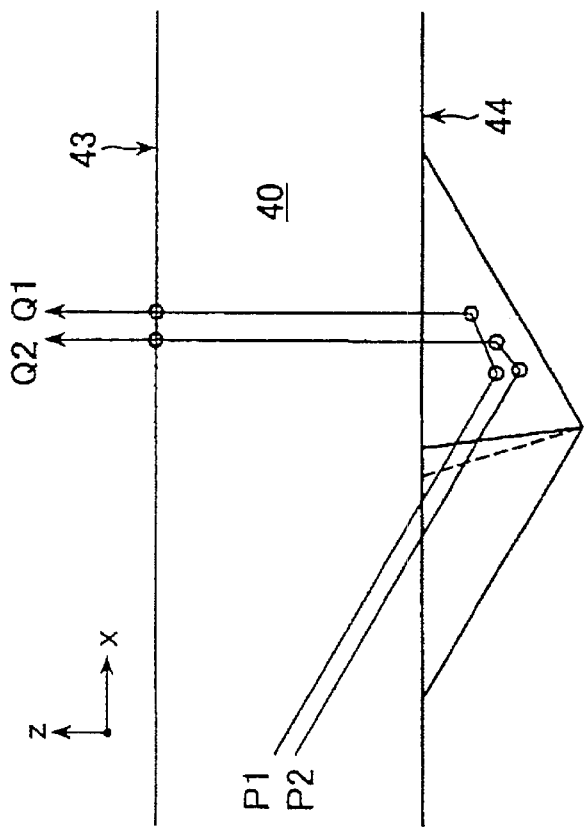

Manners of illustration in these are the same as FIGS. 4a to 4c, FIGS. 10a and 13a showing paths as viewed from +z-direction, FIGS. 10b and 13b showing paths as viewed from −y-direction and FIGS. 10c and 13c showing paths as viewed from +x-direction.

It is noted that reference numerals 40 and 50 are used for light guide plates, reference numerals 43 and 53 are used for emission faces and reference numerals 44 and 54 are used for back faces in FIGS. 10 and 13, respectively.

FIGS. 11, 12 14 and 15 are graphs to illustrate results of simulation calculation like that shown in FIGS. 5 and 6 or FIGS. 8 and 9. Manners of illustration (definitions of abscissa and ordinate, depiction of light intensity and so forth) are the same as those of FIGS. 5 and 6 or FIGS. 8 and 9, repeated explanation of which are omitted.

Figure 11:
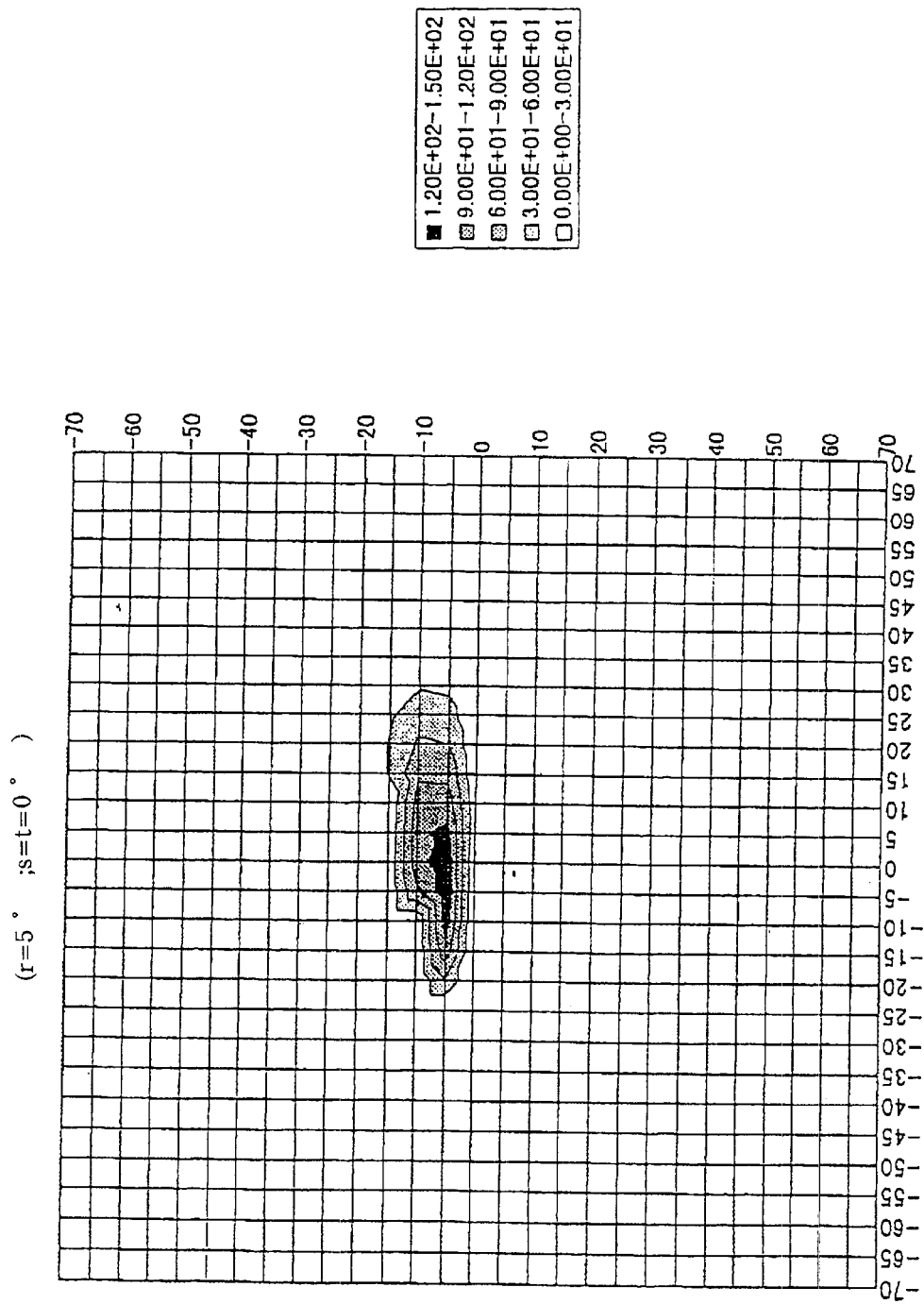
FIG. 11 is a graph to illustrate results of simulation calculation of angular characteristics of emission intensity in a case where the micro-reflector shown in FIG. 10 illustrating light paths for comparison, the intensity (after COS correction) being indicated in discrete-density shades.
Figure 12:
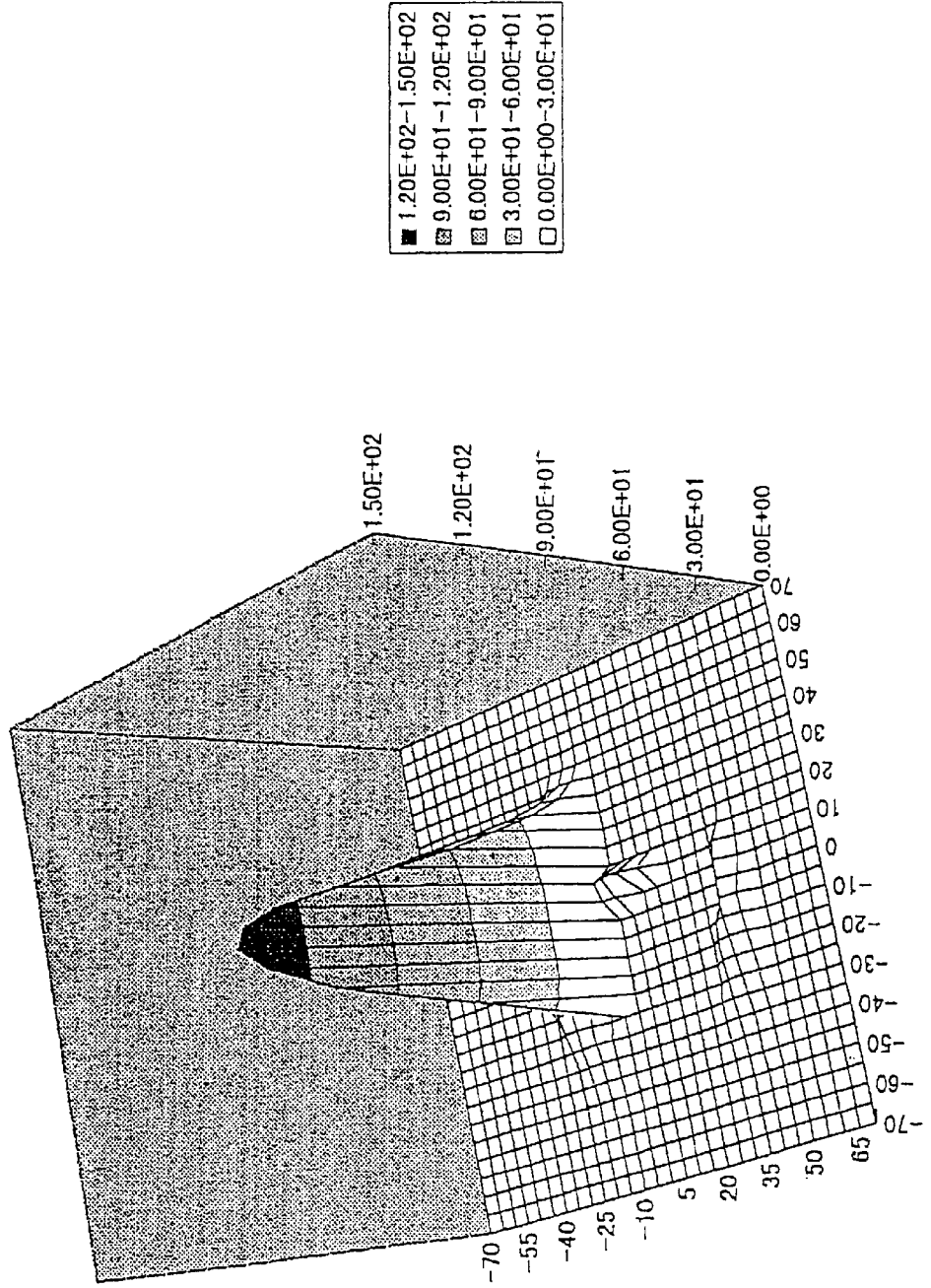
FIG. 12 is a graph prepared based on the same simulation calculation as that of FIG. 11, the intensity (after COS correction) being indicated in discrete-density shades and three-dimensional iso-brightness curves.

Comparing graphs of FIGS. 8 and 9 with graphs of FIGS. 11 and 12, it is understood that deviation from standard posture only around z-axis brings a remarkably biased viewing field in yz-plane (right-and-left directions as viewed from the incidence face 32).

Figure 14:
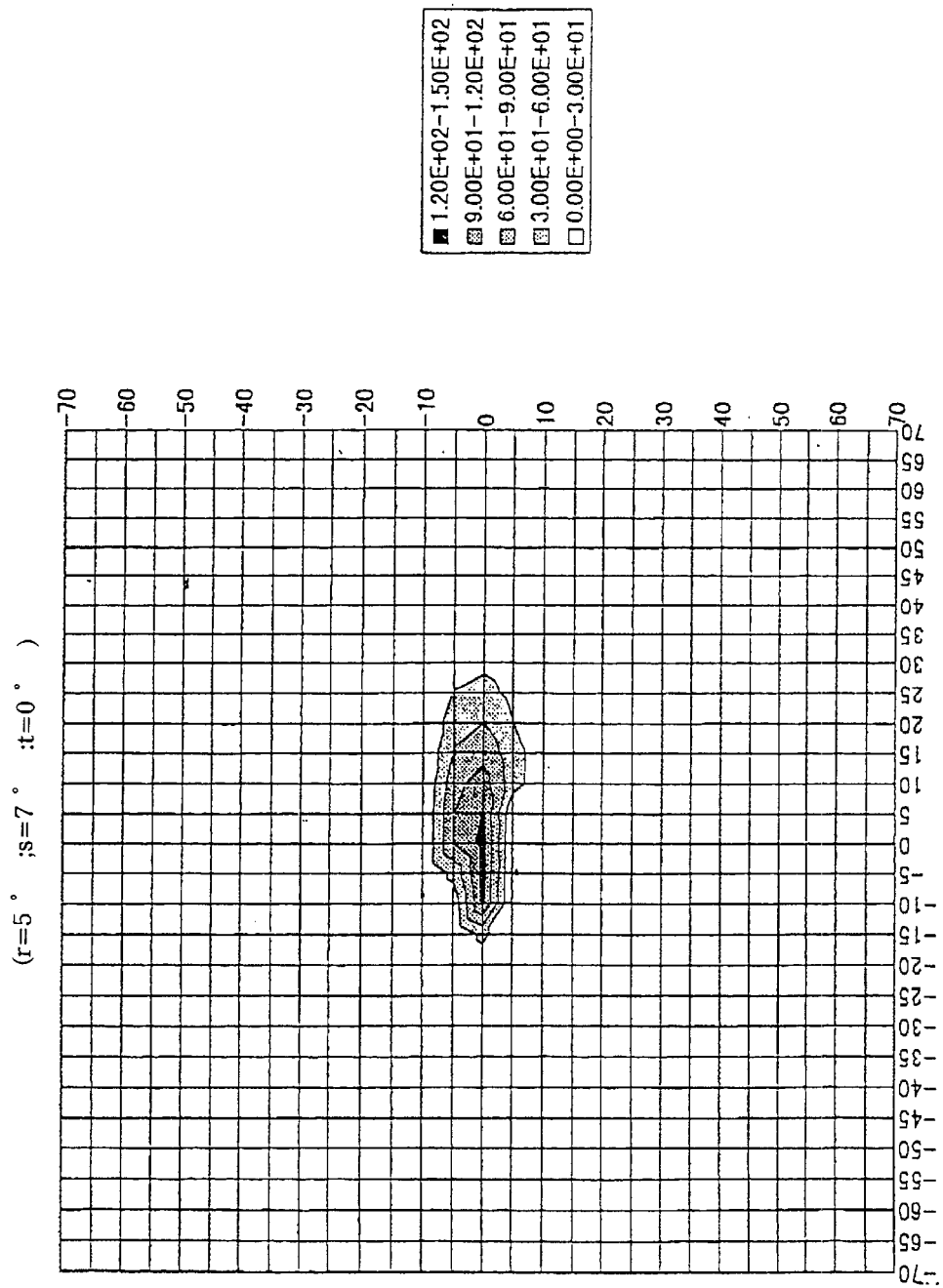
FIG. 14 is a graph to illustrate results of simulation calculation of angular characteristics of emission intensity in a case where the micro-reflector shown in FIG. 13 illustrating light paths for comparison, the intensity (after COS correction) being indicated in discrete-density shades.
Figure 15:
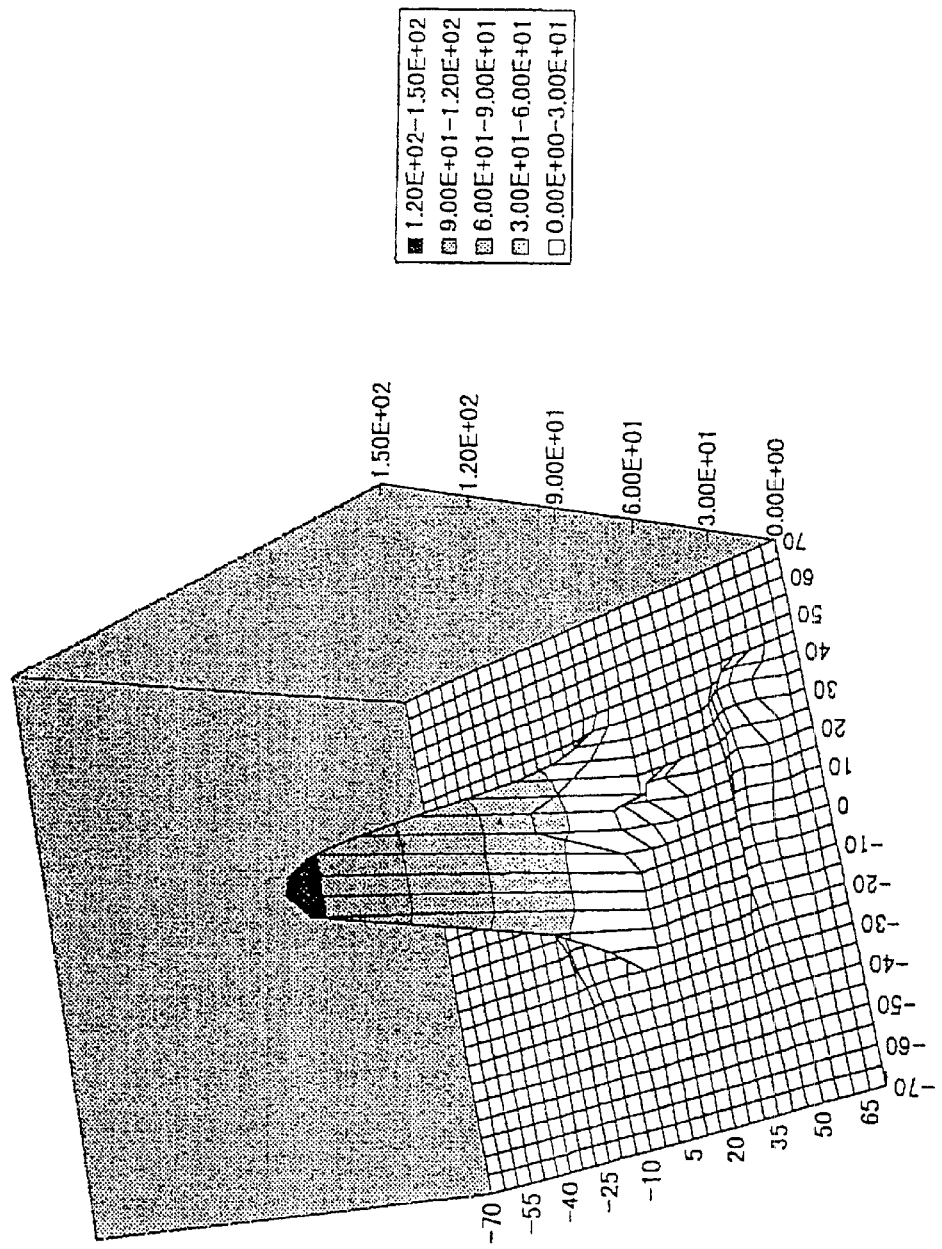
FIG. 15 is a graph prepared based on the same simulation calculation as that of FIG. 14, the intensity (after COS correction) being indicated in discrete-density shades and three-dimensional iso-brightness curves.

As understood from graphs of FIGS. 14 and 15, this bias is relaxed to some extent if deviation from standard posture around x-axis (s=7 degrees) is applied in addition to around z-axis (r=5 degrees). However, a less satisfactory improvement is obtained as compared with the present embodiment (r=5 degrees; s=7 degrees; t=2 degrees).

It should be noted that the set, r=5 degrees; s=7 degrees; t=2 degrees, is merely an example. The optimum values are determined preferably under consideration of conditions in design. Generally saying, every one of r, s and t is a small angle, and ranges which will be practical are r roughly from 3 to 10 degrees around z-axis, s roughly from 5 to 15 degrees around x-axis and s roughly from 1 to 5 degrees around y-axis.

Figure 3:
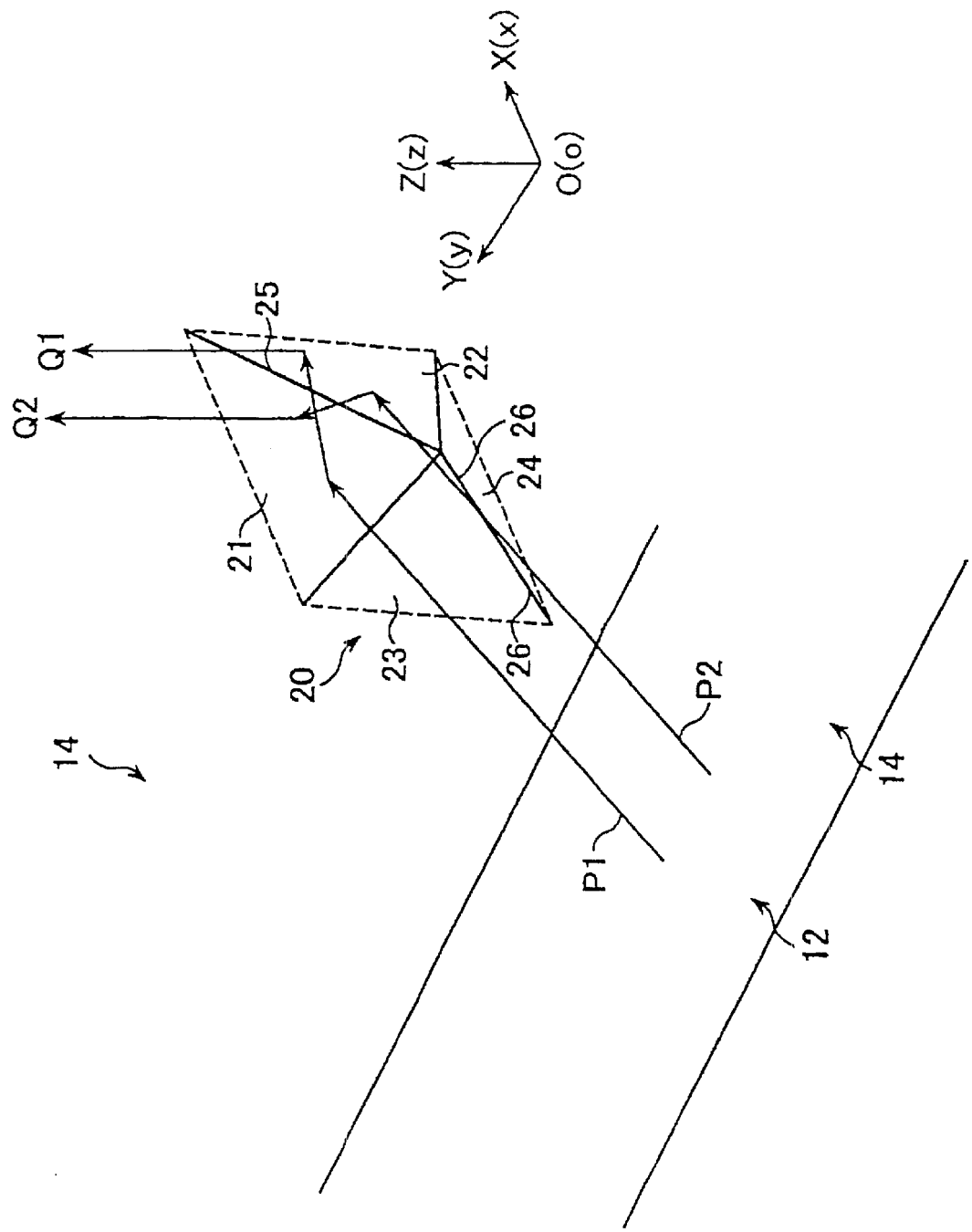
FIG. 3 is a perspective view showing one of micro-reflectors, illustrating how an inner output light is produced from an inner propagation light.

It is noted that x-axis, y-axis and z-axis do not keep fixed relations always with respect to the contour of the light guide plate 30 as mentioned with referring to FIG. 3.

Figure 16:
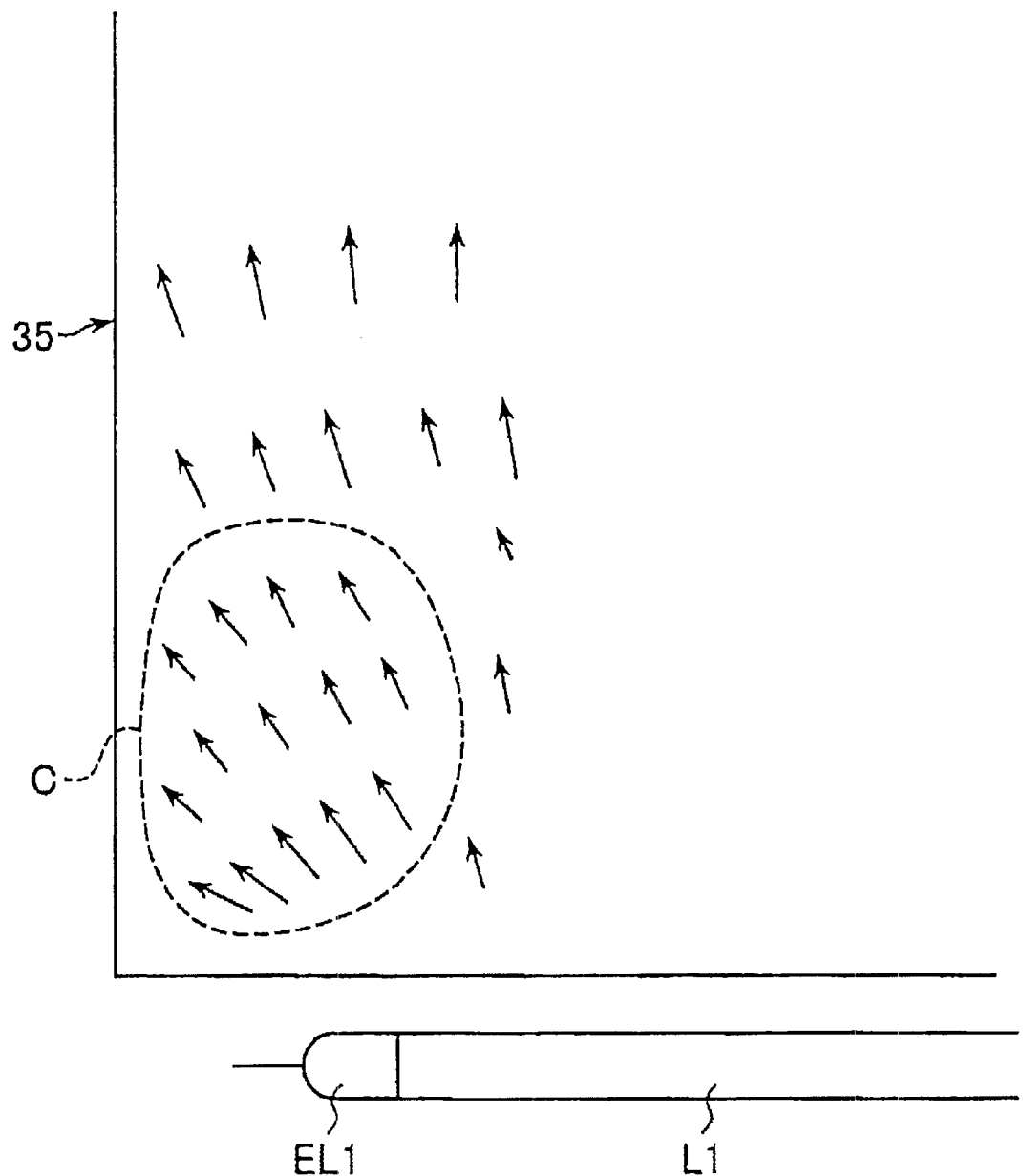
FIG. 16 exemplarily shows corner area C and around it to illustrate a relation between x-axis direction and an incidence face.

If a rod-like light source having a short emission length is disposed along the emission face 32 as shown in FIG. 2, although a large majority of the micro-reflectors have x-axes extending perpendicularly to the incidence face 32 (as x-axis shown in FIG. 3), some micro-reflectors in the corners and around them have directions of −x-axes which are inclined toward a center portion of the incidence face 32. This situation is illustrated in FIG. 16 wherein corner area C (See FIG. 2) and around it are picked up for the sake of exemplary illustration. Arrows show directions of +x-axe distributed depending on positions.

Figure 17:
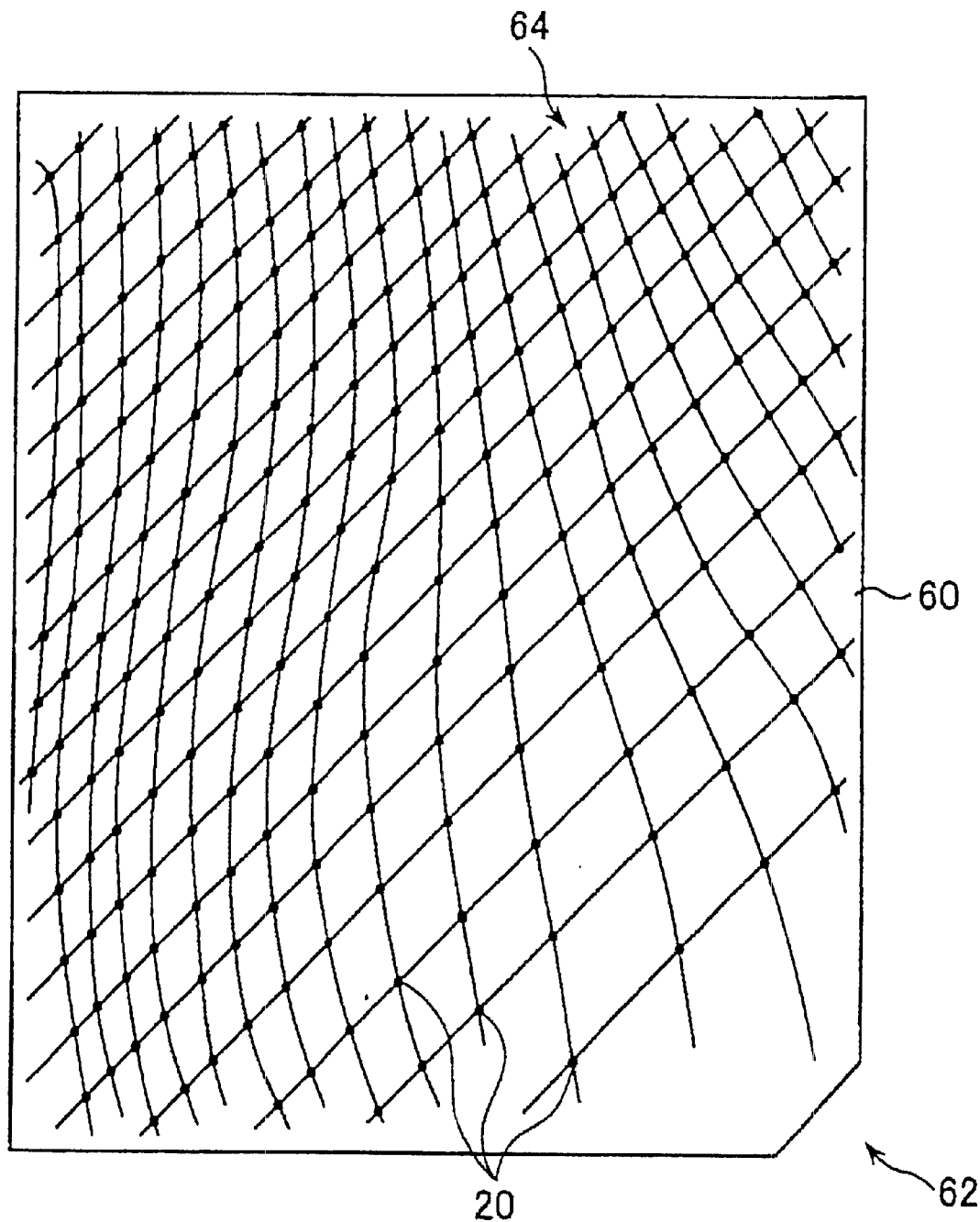
FIG. 17 illustrates an arrangement example in which a light guide plate is supplied with primary light from a corner portion of the light guide plate; and, FIG. 18 illustrates a distribution of x-axis directions in the case shown in FIG. 17.
Figure 18:
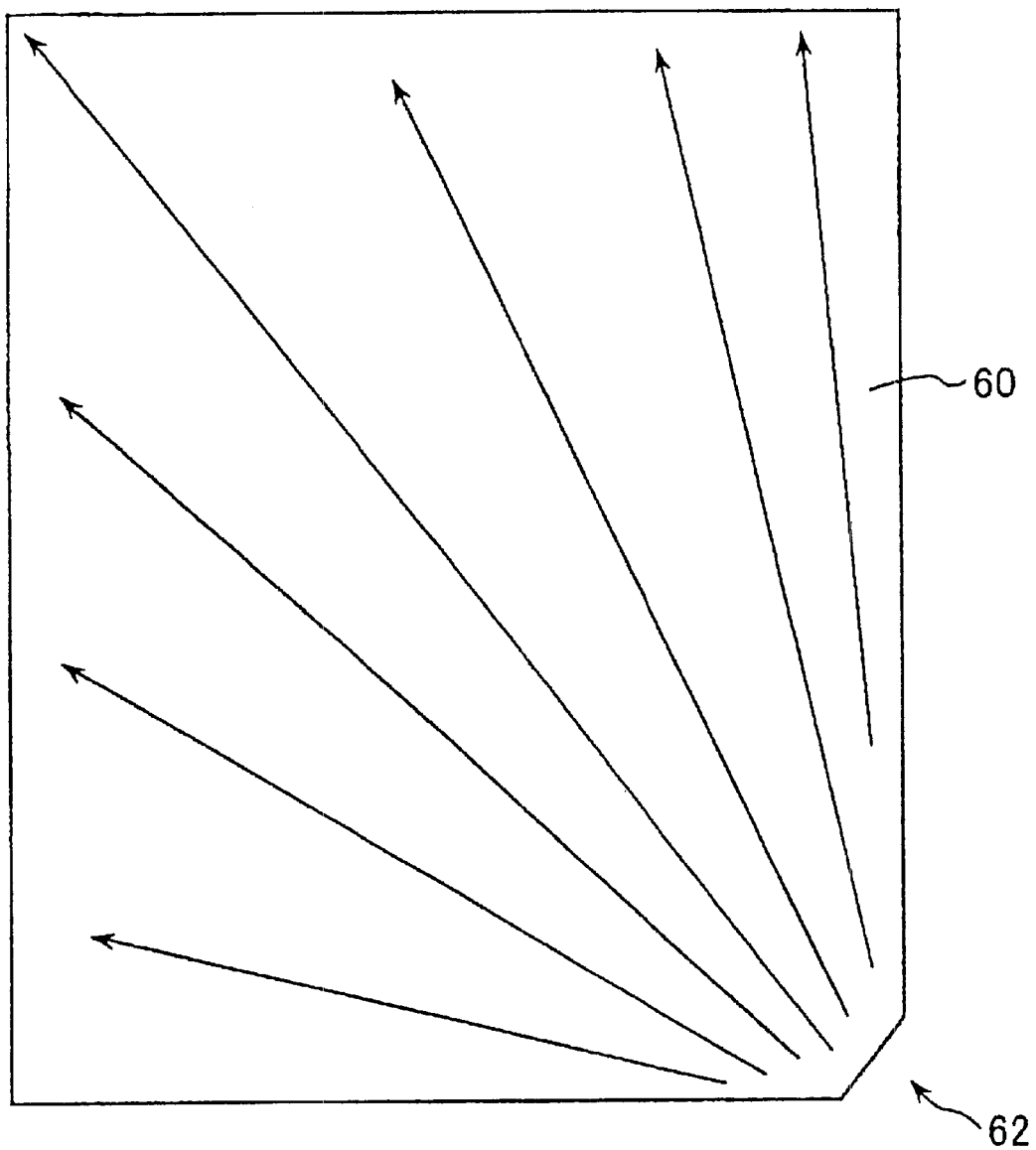

Referring to an example shown in FIG. 17, primary light is supplied from a corners portion 62 and a light guide plate 60 has a back face 64 provided with micro-reflector 20 arranged as illustrated. In this case, +x-axes have directions which are distributed as shown in FIG. 18.

It is noted that network-like curves are lines binding positions of micro-reflectors arranged and lattice points "." express individual positions at which micro-reflectors are arranged. Each micro-reflector 20 arranged at each lattice point has a posture which is deviated from standard posture in the same way as the embodiment.

The present invention provides a light guide plate, surface light source device and liquid crystal display employing the device which have not only an expanded viewing angle in a right-and-left-width direction as viewed from an incidence face side and but also a reduced fine unevenness in brightness that corresponds to micro-reflector-formed-position/micro-reflector-not-formed-position.

What is claimed is:

1. A light guide plate supplied with light from a primary light source, comprising:

an emission face provided by a major face;

a back face provided by another major face opposite with the emission face; and an incidence face for light input, wherein said back face is provided with a great number of protrusion-shaped micro-reflectors for light-proceeding-direction conversion;

each of said micro-reflectors includes a conversion output portion;

said conversion output portion includes a ridge portion, a first inner-reflection face and a second inner-reflection face, said first and second inner-reflection faces extending on both sides of said ridge portion and being inclined with respect to a first representative plane representing said back face, respectively;

said ridge, said first inner-reflection face and said second inner-reflection face provide a valley inside the micro-reflector;

said valley are configured as to get narrower and shallower according to an increasing distance from said incidence face, thereby causing an inner input light reaching the valley to be reflected one of said first and second inner reflection faces and then the other of said first and second inner reflection faces and producing an inner output light proceeding toward said emission face; and, provided that x-axis, y-axis and z-axis are defined on each of said micro-reflectors so that (1) x-axis extends along a projection of a main approaching direction of the inner input light onto a second representative plane representing said emission face, (2) z-axis extends from said back face to said emission face as to be perpendicular to said emission face and (3) y-axis extends perpendicularly to both x-axis and z-axis as to form a right-hand coordinate system in combination with x-axis and z-axis, and further provided that a standard posture of a micro-reflector is defined as a posture such that (i) a projection of an extending direction of the ridge of the conversion output portion onto xy-plane accords with x-axis direction, (ii) a bisectional plane, which bisects an angle made by said first and second inner-reflection faces so that the ridge extends on said bisectional plane, is perpendicular to xy-plane and (iii) an inner input light inner-inputted to the micro-reflector from a main approaching direction is converted into an inner output light proceeding in z-axis direction, each of said micro-reflectors has a posture which is substantially deviated from said standard posture around x-axis, y-axis and z-axis.

2. A surface light source device comprising:

a primary light source and a light guide plate supplied with light from said primary light source, said light guide plate having an emission face provided by a major face, a back face provided by another major face opposite with said emission face and an incidence face for introducing light supplied by said primary light source into said light guide plate, wherein said back face is provided with a great number of protrusion-shaped micro-reflectors for light-proceeding-direction conversion;

each of said micro-reflectors includes a conversion output portion;

said conversion output portion includes a ridge portion, a first inner-reflection face and a second inner-reflection face, said first and second inner-reflection faces extending on both sides of said ridge portion and being inclined with respect to a first representative plane representing said back face, respectively;

said ridge, said first inner-reflection face and said second inner-reflection face provide a valley inside the micro-reflector;

said valley are configured as to get narrower and shallower according to an increasing distance from said incidence face, thereby causing an inner input light reaching the valley to be reflected one of said first and second inner reflection faces and then the other of said first and second inner reflection faces and producing an inner output light proceeding toward said emission face; and, provided that x-axis, y-axis and z-axis are defined on each of said micro-reflectors so that (1) x-axis extends along a projection of a main approaching direction of the inner input light onto a second representative plane representing said emission face, (2) z-axis extends from said back face to said emission face as to be perpendicular to said emission face and (3) y-axis extends perpendicularly to both x-axis and z-axis as to form a right-hand coordinate system in combination with x-axis and z-axis, and further provided that a standard posture of a micro-reflector is defined as a posture such that (i) a projection of an extending direction of the ridge of the conversion output portion onto xy-plane accords with x-axis direction, (ii) a bisectional plane, which bisects an angle made by said first and second inner-reflection faces so that the ridge extends on said bisectional plane, is perpendicular to xy-plane and (iii) an inner input light inner-inputted to the micro-reflector from a main approaching direction is converted into an inner output light proceeding in z-axis direction, each of said micro-reflectors has a posture which is substantially deviated from said standard posture around x-axis, y-axis and z-axis.

3. A liquid crystal display comprising:

a liquid crystal display panel and a surface light source device for illuminating the liquid crystal display panel, said surface light source device comprising a primary light source and a light guide plate supplied with light from said primary light source, said light guide plate having an emission face provided by a major face, a back face provided by another major face opposite with said emission face and an incidence face for introducing light supplied by said primary light source into said light guide plate, wherein said back face is provided with a great number of protrusion-shaped micro-reflectors for light-proceeding-direction conversion;

each of said micro-reflectors includes a conversion output portion;

said conversion output portion includes a ridge portion, a first inner-reflection face and a second inner-reflection face, said first and second inner-reflection faces extending on both sides of said ridge portion and being inclined with respect to a first representative plane representing said back face, respectively;

said ridge, said first inner-reflection face and said second inner-reflection face provide a valley inside the micro-reflector;

said valley are configured as to get narrower and shallower according to an increasing distance from said incidence face, thereby causing an inner input light reaching the valley to be reflected one of said first and second inner reflection faces and then the other of said first and second inner reflection faces and producing an inner output light proceeding toward said emission face; and, provided that x-axis, y-axis and z-axis are defined on each of said micro-reflectors so that (1) x-axis extends along a projection of a main approaching direction of the inner input light onto a second representative plane representing said emission face, (2) z-axis extends from said back face to said emission face as to be perpendicular to said emission face and (3) y-axis extends perpendicularly to both x-axis and z-axis as to form a right-hand coordinate system in combination with x-axis and z-axis, and further provided that a standard posture of a micro-reflector is defined as a posture such that (i) a projection of an extending direction of the ridge of the conversion output portion onto xy-plane accords with x-axis direction, (ii) a bisectional plane, which bisects an angle made by said first and second inner-reflection faces so that the ridge extends on said bisectional plane, is perpendicular to xy-plane and (iii) an inner input light inner-inputted to the micro-reflector from a main approaching direction is converted into an inner output light proceeding in z-axis direction, each of said micro-reflectors has a posture which is substantially deviated from said standard posture around x-axis, y-axis and z-axis.

* * * * *